(12) United States Patent
Anderson et al.

(10) Patent No.: US 8,479,687 B2
(45) Date of Patent: Jul. 9, 2013

(54) BRAIDED PET CHEW

(75) Inventors: David A. Anderson, Long Beach, CA (US); Richard L. Harpe, Huntington Beach, CA (US); Howard Bloxam, Long Beach, CA (US); Jeffrey Baikie, Seal Beach, CA (US)

(73) Assignee: Redbarn Pet Products, LLC, Long Beach, CA (US)

( * ) Notice: Subject to any disclaimer, the term of this patent is extended or adjusted under 35 U.S.C. 154(b) by 1336 days.

(21) Appl. No.: 11/706,887

(22) Filed: Feb. 14, 2007

(65) Prior Publication Data

US 2007/0193531 A1    Aug. 23, 2007

Related U.S. Application Data

(60) Provisional application No. 60/775,730, filed on Feb. 22, 2006.

(51) Int. Cl.
*A01K 29/00*    (2006.01)

(52) U.S. Cl.
USPC ............................................. 119/709

(58) Field of Classification Search
USPC .................. 119/709, 710; 426/805
See application file for complete search history.

(56) References Cited

U.S. PATENT DOCUMENTS

| | | |
|---|---|---|
| 2,988,045 A | 12/1959 | Fisher |
| 4,259,361 A * | 3/1981 | Procter .................. 426/285 |
| 4,702,929 A | 10/1987 | Lehn et al. |
| 5,047,231 A | 9/1991 | Spanier et al. |
| 5,635,237 A | 6/1997 | Greenberg et al. |
| 5,673,653 A | 10/1997 | Sherrill |
| 5,897,893 A * | 4/1999 | Mohilef .................. 426/89 |
| 6,223,693 B1 | 5/2001 | Perlberg et al. |
| 6,277,420 B1 * | 8/2001 | Andersen et al. .............. 426/92 |
| 6,425,348 B1 | 7/2002 | Twain |
| 6,488,690 B1 * | 12/2002 | Morris et al. .................. 606/144 |
| D497,701 S * | 11/2004 | Tepper et al. .................. D1/120 |
| 6,840,196 B2 | 1/2005 | Kirch |
| 6,886,496 B1 | 5/2005 | Brown |
| 6,886,497 B1 | 5/2005 | Hague |
| 6,895,900 B2 | 5/2005 | Hingst |
| 6,935,275 B2 | 8/2005 | Jia et al. |

OTHER PUBLICATIONS

Pet-Expo.com (http://web.archive.org/web/20050205043814/http://www.pet-expo.com/Bully_Sticks.htm), Feb. 5, 2005.*

* cited by examiner

*Primary Examiner* — Rob Swiatek
*Assistant Examiner* — Valentina Xavier
(74) *Attorney, Agent, or Firm* — Paul M Denk

(57) ABSTRACT

A highly palatable and long lasting chew for dogs has been developed by braiding a combination of rawhide and bull, or steer, penis, known in the trade as pizzles. The pizzle is sourced directly from slaughter and the foreskin may be removed. Bleached rawhide splits are cut into rectangular pieces and rolled to form a rope-like strand equal in length to the aforementioned pizzle. Strands of 3 to 8 sections are then woven together to form an elongated braid. Such braids are then hung on racks and undergo a cooking and dehydration step to reduce the moisture content below 10% moisture. The resultant dehydrated sticks are then cut into lengths suitable for offering as a chew for dogs. Such chew is highly palatable because of the dehydrated pizzle. The chew has a very long chew time because of the dense leathery nature of the dehydrated rawhide fraction.

5 Claims, 2 Drawing Sheets

BRAIDED PET CHEW

CROSS REFERENCE TO RELATED APPLICATION

This non-provisional application claims priority to the provisional application with a Ser. No. 60/775,730 filed on Feb. 22, 2006 and is commonly owned by the same inventors.

FIELD OF THE INVENTION

This invention defines a product and process for producing a highly palatable and long lasting chew for dogs, generally made out of bull, steer, or other bovine components woven into a braided consistency.

BACKGROUND OF THE INVENTION

There is a long history of manufacturers producing treats and chews for dogs. One of the main attributes of chew type products is a toughness and flexibility to the point where it takes the dog a long time to consume the product. Numerous pig and cattle body parts such as bones, ears, hooves and skin have been used to produce palatable dog treats with extended chew times. A great majority of the chew style products have been based on rawhide. While rawhide presents an economical starting material, it is not particularly palatable to dogs, particularly smaller species which tend to be more finicky in nature. Manufacturers have attempted to solve this problem of reduced acceptability by incorporating numerous ingredients and processing techniques into the manufacture of rawhide based chews for dogs.

The basic problem however remains. As ingredients or processing techniques are utilized with rawhide to increase palatability, they typically weaken the basic structure of the rawhide and produce a less acceptable product from the standpoint of extended chew time. What is needed is a method or composition which can utilize rawhide in its relatively un-weakened state but still present a highly palatable product to the pet.

The prior art demonstrates a long history of utilizing rawhide in dog chews, Fisher (U.S. Pat. No. 2,988,045) demonstrated the basic techniques of how rawhide can be separated at the tannery and split into layers that can be formed into shapes followed by dehydration to produce a shelf-stable rawhide chew for dogs. A wide range of rawhide chew style products followed, teaching various forms, shapes and methods for utilizing a basic rawhide fraction as a dog chew. This included Lehn (U.S. Pat. No. 4,702,929) which teaches a method for extruding rawhide byproduct fraction, called spetches, with starch to form a dog chew in stick form. Spanier (U.S. Pat. No. 5,047,231) teaches a method of soaking an inorganic pyrophosphate salt into rawhide to form a chew capable of reducing tartar accumulation on the dog's teeth. Perlberg (U.S. Pat. No. 6,223,693) demonstrates a method of soaking rawhide in a humectant and soft edible binder to produce a flexible edible chew. Twain (U.S. Pat. No. 6,425,348) taught a method for producing a chewable pet shelter from rawhide which incorporated chemical flavoring which would appeal to the pet.

Kirch (U.S. Pat. No. 6,840,196) demonstrates a pet chew produced by folding a first sheet of rawhide around a second sheet of rawhide. The second sheet is impregnated with a flavoring and protrudes from under the first sheet of rawhide. This system served to increase the palatability of the chew while at the same time reduced the incident of rug staining which can be a problem when the flavoring is present on the surface of the product.

Hingst (U.S. Pat. No. 6,895,900) disclosed a combination rawhide and pigskin product where sheets of rawhide and pigskin are sandwiched or intertwined together to form a treat with improved flavor. Jia (U.S. Pat. No. 6,935,275) teaches a method for producing a dog treat by rolling a precut and flavored rawhide piece into a cylinder with strips of hide extending from the outer ends of the cylinder. And, Hague (U.S. Pat. No. 6,886,497) disclosed a product and method for infusing a rawhide or pigskin with a mint, or chlorophyll, flavoring and applying perforations to the hide so that a dog's teeth would penetrate into the product to assist in the cleaning of the dog's teeth.

Some of the most commercially successful products utilizing rawhide as dog treats have taken the approach of incorporating a meat fraction in conjunction with the rawhide to significantly increase the palatability of the chew. Sherrill (U.S. Pat. No. 5,673,653) disclosed a product and process of wrapping jerky sheets on the inside of a roll of rawhide. The jerky fraction protruded from the ends and the horizontal seam of the outside layer so that the dog could quickly be subjected to the flavor of the dehydrated meat fraction. This product has been successfully commercialized under the trade name "Dingo". Only a small portion of meat fraction however is initially available to the dog and the manufacturing method of rolling sheets of rawhide inside sheets of jerky significantly reduce the quantity of meat that can be incorporated on a dry weight basis.

Greenburg (U.S. Pat. No. 5,635,237) teaches a method of melting rawhide scraps inside of a twin-screw extruder and producing ropes that can be cut and tied to produce a formulated knotted rawhide bone. While small quantities of meat or flavoring can be incorporated with this method, the necessity to feed the extruder at a reduced moisture level limits the amount of meat fraction that can be included. Andersen (U.S. Pat. No. 6,277,420) demonstrates a method of making a preformed rawhide tube and depositing a shelf-stable liquid meaty filling into the cavity of the tube which gels and then forms a solid matrix on the inside of the rawhide. While this system incorporates large ratios of meaty filling fraction to rawhide, the chew time is somewhat reduced by the high moisture present in the system. Brown (U.S. Pat. No. 6,886,496) has attempted to solve this problem by producing a pre-extruded dried meaty log that could be placed inside of a rolled rawhide cylinder. While this would result in a somewhat extended chew time over many of the earlier treats, a limited fraction of meat is available on the surface of the final chew to maintain a dog's interest for an extended period of time.

SUMMARY OF THE INVENTION

This invention relates generally to the braiding of various components of the bull or steer, such as a part of the hide, the male organ, or other components, braided into a length and structure for use as a pet chew.

This invention combines two different fractions that have extensive historical use in dog chews. The primary raw material is rawhide which has been lightly bleached, split into thin sheets and cut into rectangles. Such rectangles are then rolled in the width direction to produce ropes appropriate for weaving or braiding.

The second raw material is cleaned bull, or steer, penises—called "pizzle" in the trade—which have had the foreskin removed prior to the weaving step. Dehydrated bull penises have been sold for years as a highly palatable and somewhat long lasting chew for dogs. Because they are 100% meat based, they are very palatable to dogs. They shrink during a controlled drying step to form very dense dehydrated muscle fractions that have extended chew times when compared to more typical treats such as jerky, biscuits or injection molded wheat, potato or starch based bones.

The present invention is then created by braiding or weaving together combinations of the preformed rawhide ropes with fresh cleaned penis segments. A minimum of three strands must be used for the weaving step and can be composed of any ratio of rawhide ropes to bull or steer penises. The maximum number of strands is somewhat indefinite but from a practical standpoint becomes very cumbersome and time consuming if it exceeds about ten strands in total.

In the present invention, it has been found that larger diameter raw material works best when producing 3 or 4 strand braids and that thinner material should be utilized when producing weaves exceeding about 5 strands in composition. Bull penises have a somewhat larger diameter and function best when utilized for the 3 or 4 strand braids.

Steer penises are somewhat thinner in diameter and function best when attempting to weave a large number of strands into a multiple strand weave. It is best if the diameter of the rawhide rope is sized to approximately the same diameter as the starting penis fraction when both materials are in the wet state.

Alternatively, the bull penis may be cut lengthwise into halves or quarters to produce a smaller and more economical meat fraction for use in the braiding step.

In this invention, the ratio of the number of strands of rawhide fraction to penis fraction can be varied. In general, the palatability of the end product will be greater with a higher percentage of penis fractions, while the "chew-time" of the finished product will be longer with a higher percentage of rawhide rope fractions.

It has been found that the preferred ratio of rawhide fraction to penis fraction will be in the range of approximately 2 parts rawhide to 1 part penis. Utilizing this ratio produces a chew with excellent palatability and an exceptionally long "chew-time".

In the production of the chew, the rawhide ropes are rolled in their wet state to match the diameter of the penis fraction. The desired number of strands are then hung side-by-side and in an overlapping manner and tied together at the upper end utilizing an edible catgut material. The weaver then braids the strands together utilizing the typical techniques utilized for producing braided ropes, leather, clothing or hair strands. At the bottom, when all of the material has been utilized in the weave, the fractions are again held together by a wrap of edible catgut fraction.

The braided or woven material is then dehydrated to a shelf-stable moisture level below 10% moisture. This is done in a large tunnel or conveyor dryers utilizing drying temperatures between 120° and 180° F. Following dehydration, the woven sticks can be cut into any length desired for commercial distribution.

It is, therefore, the principle object of the invention to provide a braided chew made from lengths of a various components of the bull or steer, such as a portion of the rawhide, strips of the penis, and other components, that are woven into the structure of a pet chew.

Another object of this invention is to provide a pet chew which is flavorful to the animal.

Another object of this invention is to provide a pet chew that can be marketed in the dry form, and does not require any extensive chilling, when displayed for marketing or stored for usage.

Still another object of this invention is to provide a dehydrated form of pet chew that is readily available for application to the dog, and related pets.

Another object of this invention is to provide a pet chew that is woven from strands of tissue, that which is very strong and its physical constituency, and very lasting to the pet as an effective, nutritional, and challenging chew.

Another object of the present invention is to provide a chew for dogs with both high palatability and an extended "chew time".

Another object of this invention is to create a chew with a large surface area of beef muscle tissue present on the outer surface area.

It is a further object of this invention for such outer meaty fraction to, in and of itself, have an extended chew time, in addition to further chew time improvement that can be supplied from the incorporation of a rawhide fraction.

These and other objects may become more apparent to those skilled in the art upon review of the summary of the invention as provided herein, and upon undertaken a study of the description of its preferred embodiments, in view of the drawings.

BRIEF DESCRIPTION OF THE DRAWINGS

Referring to the drawings.

The same reference numerals refer to the same parts throughout the various figures.

DESCRIPTION OF THE PREFERRED EMBODIMENT

Figure 1:
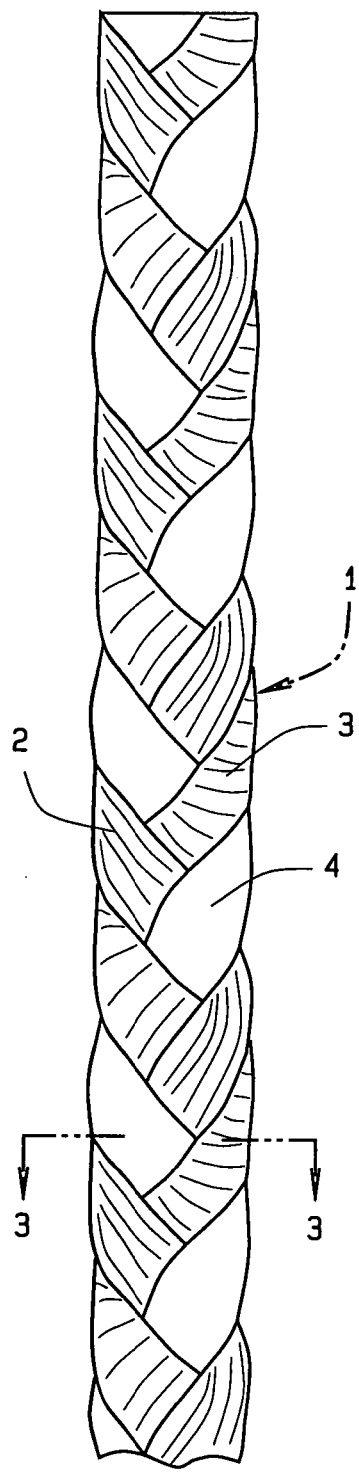
FIG. 1 provides a view of a length of braided dog treat combining one strip of rolled rawhide and two strips of bull penis into a length of pet chew.
Figure 2:
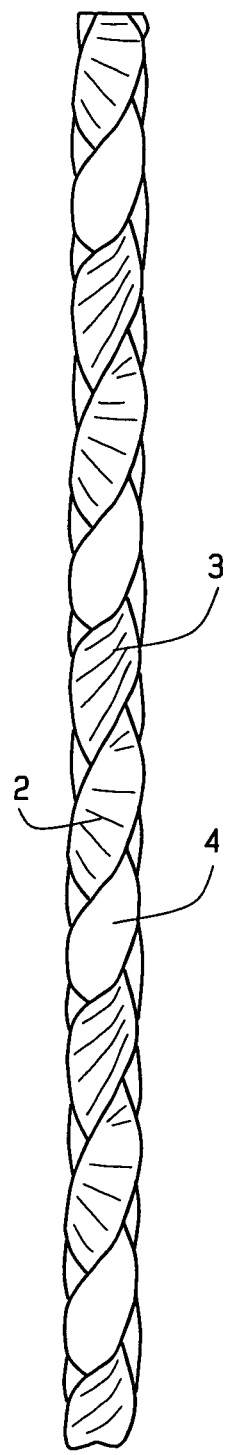
FIG. 2 is a side view of the pet chew of FIG. 1.
Figure 3:
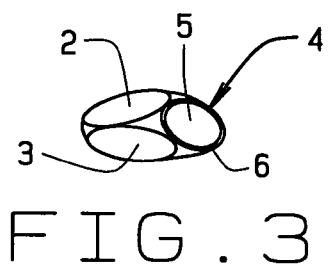
FIG. 3 is a cross sectional view of the pet chew taken along the line 3-3 of FIG. 1.

In the present invention, FIG. 1 shows a braided pet chew 1 of this invention, wherein there are braided together a series of strips of animal components, normally of the steer or bull, and in the particular instance, includes the weaving together of two strips of bull penis, as noted at 2 and 3, and a single strip of rolled rawhide, as at 4. These strips are woven together in the standard weaving process, generally known in the art, or woven from a series of these components, which are rolled or otherwise formed into a more rope like consistency, as can be seen in the cross section as shown in FIG. 3. Generally, the components will be rolled into strips of rolled rawhide, as can be seen in FIGS. 2 and 3 so as to form a more strand or rope like consistency, that is more easily woven, into the braided configuration as shown in the drawings. Furthermore, the components of the penis will likewise be rolled, having internal muscle texture, as at 5, that may be surrounded by a skin or surface layer component 6, so as to add to its strength during the weaving process.

Figure 4:
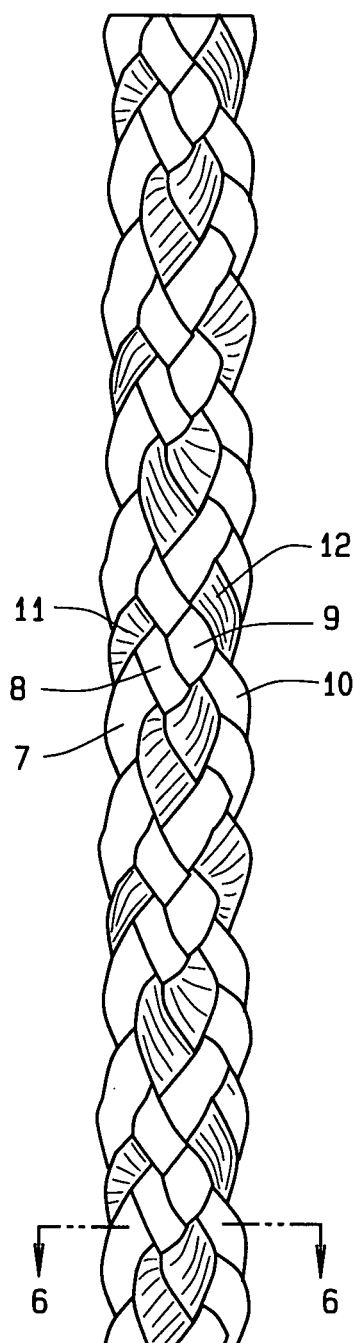
FIG. 4 is a front view of a modified pet chew wherein a plurality of strips of flat rawhide and a plurality of strips of steer penises are woven or braided into a length of pet chew.
Figure 5:
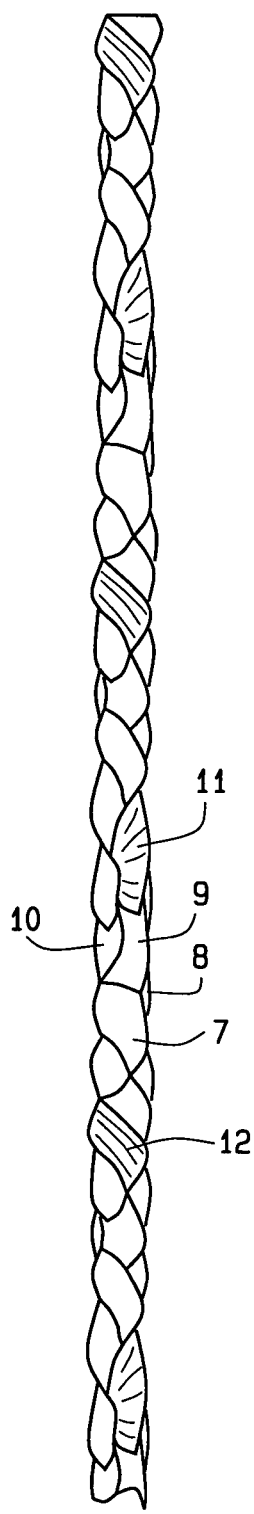
FIG. 5 is a side view thereof.
Figure 6:
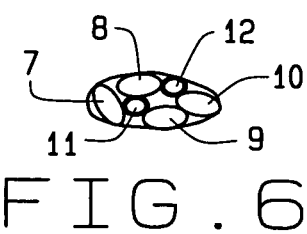
FIG. 6 is a cross sectional view of the pet chew taken along the line 6-6 of FIG. 4.

FIG. 4 shows the woven consistency for a series of braided strands of material, as previously reviewed, with the rawhide component generally being shown in FIG. 4 and includes, in this particular example, approximately 4 strands of rawhide, as can be seen at 7, 8, 9 and 10, and intermediately woven within this structure are a pair of lengths of strand penis material, as at 11 and 12. These strands are woven tightly together, in the manner as shown, through standard weaving techniques, to any length that is desired, and then can be cut to that dimension desired for the finished product. Obviously, the more the strands that are woven into the pet chew, the greater will be its diameter unless the strands are narrowed, so that the pet chew of FIG. 4, and as seen in side view in FIG. 5, will be of a greater width dimension, and having a diametric width that is more than what is shown or described in FIG. 1. On the other hand, the diameter of the finished product will also depend upon the thickness of the individual strands that are woven into the chew, in the first instance. Nevertheless, the more strands involved, the greater the facility there is to obtain a pet chew of a greater dimension, diameter wise, generally as can be seen in FIG. 6.

In the present invention, the initial step is to prepare the separate rawhide 4 and bull penis 2, 3 fractions. Bleached rawhide is sourced and split into sheets between 2 and 4 mm in thickness. The wet rawhide is cut into rectangles approximately 34 inches long and 1.5 inches wide. The strips are then tightly rolled in the widthwise direction to produce ropes about ¾ inch in diameter. Bull penises are cleaned to remove the foreskin and any excess fatty membrane and matched in size to select a length that is equal to the 34 inch long rawhide fraction. In the first embodiment of this invention, a rawhide/bull penis combination treat is produced by taking two of the rawhide ropes and one of the bull penises. They are hung together on a single meat hook and are sewed together at the hung end with edible catgut to connect the three fractions. The products are then braided together utilizing typical rug braiding techniques. Catgut is again used at the bottom end to hold the tips together. The braid is then hung in a dryer and dehydrated to below 8% moisture content utilizing hot air. Following the dehydration step, the product is cut into the desired lengths for commercial distribution. The preferred length is typically between about 5 inches and 16 inches.

In an alternative method of manufacture, the rawhide may be braided from a flat strip rather than rolling the rawhide into a rope. For this alternative, we have found it best to cut a slightly thicker split typically between about 4 mm and 5 mm in thickness. The ratio of flat rawhide strips to cleaned bull penis may vary depending upon the desired palatability and preferred chew time for the treat. The flat rawhide strips are hung with the bull penis sections and again braided until all of the raw material has been converted into a braided form.

In the third alternative, the bull penis fraction can be slit in the lengthwise direction to produce either two or four bull penis strands from each bull penis. The smaller diameter muscle meat fraction can be utilized to produce a more economical treat and can also be utilized to produce what is know in the trade as "weaves" which are braided treats utilizing a larger number of individual strands of both rawhide fraction and bull penis fraction. When utilizing a number of strands in excess of about four it becomes preferred to utilize sliced bull penis fraction and flat, rather than rolled, rawhide material.

In the fourth alternative of this invention, we have demonstrated that it is possible to take shorter length bull penises, or steer penises, and sew them together with catgut to produce longer ropes of the raw material to use for braiding purposes. When utilizing these smaller diameter pieces, we have found that it is preferred to utilize flat rawhide strips as the rawhide raw material fraction utilized for braiding with bull or steer penis fractions that have been sewed together.

Obviously, the method of weaving these components together, and the number of strips of parts of the bull hide and penis that are woven together, will depend upon the size and consistency of the strips that are desired for the final product. In other words, multiple strips of rolled rawhide, and multiple strips of the stranded penis, may be woven together into the consistency of the pet chew, as described herein. The number of the strips used is only limited by the size of the pet chew as desired for the final product. For example, if a short length of pet chew, but having a thicker diameter, is desired, then more strands may be woven together, and cut to shorter lengths, so as to form kind of smaller bite size pet chews in their consistency.

The following Examples are set forth as illustrative of this invention:

EXAMPLE 1

Two 32 inches long and 1.5 inch wide pieces of bleached rawhide split 3.0 mm thick were cut from the underside part of a cattle hide. The pieces weighed between 102 and 118 grams each in the wet state. They were rolled in the widthwise direction to form rawhide ropes. A 32 inches long bull penis was cleaned by removing the foreskin and outer grizzle material. The penis had a weight of 382 grams prior to braiding. The three strips were then hung vertically on a meat-hook and were sewed together at the top with catgut fraction. The pieces were then braided together using a typical rug weaving technique until the entire penis fraction and rawhide fraction had been braided. The three members were again joined together at the bottom with catgut fraction.

The wet braid was 27 inches long and weighed 612 grams. It was hung in a vertical position in a hot air dryer dehydrator. It was dried for 15 hours at 140° F. followed by further dehydration for 24 hours at 155° F. Dehydration was continued at 175° F. for an additional 24 hours. The final moisture level was reduced to 7.5% moisture at the end of this dehydration step. The product had also shrunk in length to approximately 22 inches following dehydration. The final product had a weight of 171 grams.

The stick was cut into two 11 inch lengths to form the finished dog treat. A feeding study was conducted on numerous sticks made with the above process. The resultant treat was found to have a chew time exceeding two hours even on relatively large dogs and the palatability was readily acceptable to all of the animals tested.

EXAMPLE 2

In a second alternative of the present invention, a long lasting and highly palatable treat for dogs was produced by braiding two separate bull penis fractions with a single roll of rawhide. As in Example 1 above, the rawhide rope fraction was 32 inches long and was produced by rolling a rectangular piece of approximately 3.5 mm thick bleached rawhide split. The rawhide rope was hung in a vertical direction from a meat-hook and two cleaned bull penises were hung beside the rawhide rope fraction. The three components were sewn together at the meat-hook end and were braided together utilizing a typical rug braiding pattern. The finished weave was 25 inches long and had a wet weight of 884 grams which included 120 grams of wet rawhide fraction and 764 grams of bull penis fraction.

The rawhide/bully weave was dehydrated in a hot air oven at 140° F. for 15 hours. The temperature was then raised to 155° F. and the treat was dried for an additional 24 hours. Drying was then completed at 175° F. for an additional 48 hours. On the completion of drying, it was 19.5 inches long and had a gross weight of 251 grams. It was cut in half to produce two dog chews each approximately 10 inches long.

EXAMPLE 3

In the third Example of this invention, a treat for dogs was produced by weaving together 4 strips of rawhide with 2 steer penises. The rawhide fraction, rather than being rolled into a rope shape was left in rectangular strips approximately 0.75" in width. The strips were approximately 4 mm in thickness and were cut in length to match the length of the steer penises. Steer penises are typically somewhat shorter and somewhat smaller in diameter than bull penises. In order to facilitate the weaving step, we have found it advantageous to utilize a catgut fraction to sew together two or more of the steer penises from end to end to produce a single strand that is approximately 25 inches to 35 inches in total length. In this example, we utilized 4 rawhide strips each 30 inches in length and two steer penis sections each 30 inches in length and each composed of two steer penises that had been sewed together end to end. The two strands of steer penis had a total weight of 205 grams. The four strips of bleached rawhide had a total weight of 120 grams.

The six separate strands were attached to a meat-hook and were tied together at the top with catgut fraction. The six strands were then weaved together utilizing typical rug weaving techniques. The completed weave was approximately 21 inches in length prior to the dehydration step. The weave was dehydrated for 14 hours at 140° F. followed by an additional dehydration step of 155° F. for 24 hours. A final dehydration was conducted at 175° F. for 24 hours. Following the dehydration, the weave had shrunk in length to 18 inches and had a gross weight of 98 grams. The product was cut in half to produce two separate treats for dogs each approximately 7.5 inches in length.

A large quantity of treats was made with the above technique and feeding studies were conducted to determine the acceptability of the weave and more importantly the resulting chew-time of the treat. The testing determined that the weaves produced a product that was readily accepted by dogs and that the chew-time was extended compared to a treat produced solely from steer penis fraction.

EXAMPLE 4

A fourth example of the present invention was produced by weaving 4 flat strips of bleached rawhide with 2 bull penis fractions. In this case, to make a more economical product, cleaned bull penis fractions were sliced in half along the lengthwise direction to produce half moon shaped ropes that were utilized for the weaving step. Two half moon strips having a total length of 32 inches each with a total weight for the two pieces of 362 grams were utilized for the bull penis fraction.

The rawhide utilized for this weave was flat bleached strips of cow belly hide that were cut to a length of 32 inches and a width of ¾ inch. The 4 strips had a total weight of 120 grams. The four separate pieces were hung from a meat hook with the 2 bull penis ropes placed proportionally between the four strips of flat rawhide. The six separate components were then weaved together utilizing standard rug weaving techniques to produce a single weaved fraction that was approximately 26 inches long and 3 inches in width.

The belly/rawhide weave was dehydrated for 15 hours at 140° F. followed by an additional dehydration of 24 hours at 155° F. and a final dehydration of 24 hours at 175° F. The final moisture level was 6.5%. The weave shrank during the dehydration step to approximately 23 inches in length. Following dehydration, the product was cut in half at the midpoint to produce two treats each approximately 12 inches in length. Feeding studies of treats made in this manner showed exceptional palatability and a long chew time.

Variations or modifications to the subject matter of this invention may occur to those skilled in the art upon review of the disclosure as provided herein. Such variations, if within the spirit of this development, are intended to be encompassed within the scope of the claims as set forth herein. For example, the strands of rawhide and penis may not only come from the bull, steer, cow or other bovine, but could also be obtained from other animals, such as the deer, elk, or even other animals that may become deceased, as at a zoo, game park, or even animals that are legally harvested in the wild. The description of the preferred embodiment as set forth herein, and as depicted in the drawings, is provided for illustrative purposes only.

We claim:

1. An elongated linear solid pet chew formed from strands of material obtained from a bull, steer or other bovine, or animal, including:
    there being at least five of said strands, said strands of rawhide being of flat shape and said strands of animal penis being sliced longitudinally attaining a semi-circular cross section and being from a steer;
    at least one strand of rawhide and at least one strand from a penis of at least one of said animals;
    said strands of rawhide and of animal penis being interwoven into said pet chew in a number required to obtain the desired width; and,
    said pet chew following interweaving of said strands of rawhide and of animal penis then being dehydrated to less than 10% moisture content by weight and cut to a desired length.

2. The pet chew of claim 1 further comprising:
    said strands of rawhide and of animal penis being tied at each end with an edible elongated material.

3. The pet chew of claim 2 wherein said edible elongated material is catgut.

4. A method of forming a pet chew from strands of material obtained from a bull, steer or other bovine, or animal, comprising:
    fabricating at least one strand of rawhide and at least one strand from an animal penis, said fabricating including slicing said at least one animal penis longitudinally;
    interweaving said strands in the number required to obtain the width and the length of said pet chew; and,
    dehydrating said pet chew in a dryer for at least fourteen hours at temperatures of approximately 120° F. to approximately 180° F. to less than 10% moisture content by weight for shelf stability.

5. A method of forming a pet chew from strands of material obtained from a bull, steer or other bovine, or animal, comprising:
    fabricating at least one strand of rawhide and at least one strand from an animal penis;
    interweaving said strands in the number required to obtain the width and the length of said pet chew;
    dehydrating said pet chew in a dryer for at least 14 hours at temperatures of approximately 120° F. to approximately 180° F. to less than 10% moisture content by weight for shelf stability; and said dehydrating including a first dehydrating at a temperature of at least 140° F. for at least 14 hours in a dryer, a second dehydrating at a temperature of at least 150° F. for at least 24 hours in a dryer, and a third dehydrating at a temperature of at least 170° F. for at least 24 hours in a dryer.

\* \* \* \* \*